United States Patent [19]

Kraft, IV

[11] Patent Number: 5,870,767

[45] Date of Patent: Feb. 9, 1999

[54] METHOD AND SYSTEM FOR RENDERING HYPER-LINK INFORMATION IN A PRINTABLE MEDIUM FROM A GRAPHICAL USER INTERFACE

[75] Inventor: George Kraft, IV, Austin, Tex.

[73] Assignee: International Business Machines Corporation, Armonk, N.Y.

[21] Appl. No.: 755,426

[22] Filed: Nov. 22, 1996

[51] Int. Cl.$^6$ .................................................. G06F 3/00

[52] U.S. Cl. ........................ 707/501; 707/512; 707/513; 707/537

[58] Field of Search ................................... 707/501, 511, 707/512, 513, 514, 526, 527, 537, 10, 104; 345/335, 336

[56] References Cited

U.S. PATENT DOCUMENTS

| | | | |
|---|---|---|---|
| 4,982,344 | 1/1991 | Jordan | 345/346 |
| 5,175,684 | 12/1992 | Chong | 704/3 |
| 5,440,678 | 8/1995 | Eisen et al. | 707/537 |
| 5,506,984 | 4/1996 | Miller | 707/10 |
| 5,530,852 | 6/1996 | Meske, Jr. et al. | 395/200.36 |
| 5,692,073 | 11/1997 | Cass | 382/219 |

OTHER PUBLICATIONS

Netscape Navigator® Version 3.0, Netscape Communications Corporation, 1996, Screen Printouts 1–6.

Greaney ("Netscape 3.0 Final Now Get It Before The Rush!", BrowserWatch News, Aug. 17, 1996, p. 1.

Wilson, Map This!, The Freeware World Wide Web Image Map Editor, 1995, pp. 1–2.

*Primary Examiner*—Stephen S. Hong
*Attorney, Agent, or Firm*—Richard A. Henkler; Kermit D. Lopez; Andrew J. Dillon

[57] ABSTRACT

A method and system for rendering in a printable medium hyper-link information contained in a document displayed within a graphical user interface within a data processing system linked to other data processing systems in a data processing network. A document constructed from data generated at a data processing network server is selected and displayed within a graphical user interface. Thereafter, in response to the selection of the document, if the document includes hyper-link information, a reference object is generated. Next, the reference object is associated with the hyper-link information. Thereafter, in response to a user input, the document is automatically printed in a printable medium, in association with the reference object, such that the hyper-link information is automatically presented in association with the printed document.

10 Claims, 6 Drawing Sheets

Fig. 7

This is an example hyper-text document constructed from a mark-up language such as Hyper-Text Markup Language (HTML). This document can be displayed in a graphical user interface environment and contains hyper-text address links to IBM[1]. An example of an IBM[1] address link is "http://www.austin.ibm.com". When printed in hardcopy form such as this document, the IBM[1] address links are automatically presented as reference objects or footnotes in the hardcopy document. The string text rendered to a graphical user interface screen stands out from the surrounding text. The different font format of the phrase IBM[1], in this case bold, italicized and underlined, is an indication that the text is hyper-linked to jump to another document. Visit IBM[1] on the world wide web.

1. http://www.austin.ibm.com

METHOD AND SYSTEM FOR RENDERING HYPER-LINK INFORMATION IN A PRINTABLE MEDIUM FROM A GRAPHICAL USER INTERFACE

BACKGROUND OF THE INVENTION

1. Technical Field:

The present invention relates to information retrieval in data processing systems. In particular, the present invention relates to data processing systems which are linked to other data processing systems by an associated linking network. More particularly, the present invention relates to associated networks which utilize mark-up languages. Still more particularly, the present invention relates to a method and system for rendering hyper-text documents in a printable medium while retaining hyper-link information.

2. Description of the Related Art:

The development of computerized information resources, such as the "Internet" and the proliferation of "web" browsers allow users of data processing systems to link with other servers and networks, and thus retrieve vast amounts of electronic information heretofore unavailable in an electronic medium. Such electronic information is increasingly displacing more conventional means of information transmission, such as newspapers, magazines, and even, television. In communications, a set of computer networks which are possibly dissimilar from one another are joined together by "gateways" that handle data transfer and the conversion of messages from the sending network to the protocols used by the receiving network, with packets if necessary. A gateway is a device used to connect dissimilar networks (i.e., networks utilizing different communication protocols) so that electronic information can be passed from one network to the other. Gateways transfer electronic information, converting such information to a form compatible with the protocols used by the second network for transport and delivery. The term "internet" is an abbreviation for "internetwork," and refers commonly to the collection of networks and gateways that utilize the TCP/IP suite of protocols, which are well-known in the art of computer networking. TCP/IP is an acronym for "Transport Control Protocol/interface Program," a software protocol developed by the Department of Defense for communication between computers.

Electronic information transferred between data processing networks is usually presented in hyper-text, a metaphor for presenting information in a manner in which text, images, sounds, and actions become linked together in a complex non-sequential web of associations that permit the user to "browse" through related topics, regardless of the presented order of the topics. These links are often established by both the author of a hyper-text document and by the user, depending on the intent of the hyper-text document. For example, traveling among links to the word "iron" in an article displayed within a graphical user interface in a data processing system might lead the user to the periodic table of the chemical elements (i.e., linked by the word "iron"), or to a reference to the use of iron in weapons in Europe in the Dark Ages. The term "hyper-text" was coined in the 1960s to describe documents, as presented by a computer, that express the nonlinear structure of ideas, as opposed to the linear format of books, film, and speech.

The term "hyper-media," on the other hand, more recently introduced, is nearly synonymous with "hyper-text" but focuses on the nontextual components of hyper-text, such as animation, recorded sound, and video. Hyper-media is the integration of graphics, sound, video, or any combination into a primarily associative system of information storage and retrieval. Hyper-media, as well as hyper-text, especially in an interactive format where choices are controlled by the user, is structured around the idea of offering a working and learning environment that parallels human thinking—that is, an environment that allows the user to make associations between topics rather than move sequentially from one to the next, as in an alphabetic list. Hyper-media, as well as hyper-text topics, are thus linked in a manner that allows the user to jump from one subject to other related subjects during a search for information. Hyper-link information, such as "World Wide Web" address sites, are contained within hyper-media and hyper-text documents, which allow a user to go back to the "original" or referring Web site by the mere "click" (i.e., with a mouse or other pointing device) of the hyper-linked topic.

A typical networked system which utilizes hyper-text and hyper-media conventions follows a client/server architecture. The "client" is a member of a class or group that uses the services of another class or group to which it is not related. Thus, in computing, a client is a process (i.e., roughly a program or task) that requests a service provided by another program. The client process utilizes the requested service without having to "know" any working details about the other program or the service itself. Thus, in a client/server architecture, particularly a networked system, a client is usually a computer that accesses shared network resources provided by another computer (i.e., a server).

In such a client/server architecture, a request by a user for news can be sent by a client application program to a server. Such a server is typically a remote computer system accessible over the Internet or other communication medium. The server scans and searches for raw (e.g., unprocessed) information sources (e.g., newswire feeds or newsgroups). Based upon such requests by the user, the server presents filtered electronic information as server responses to the client process. The client process may be active in a first computer system, and the server process may be active in a second computer system, and communicate with one another over a communication medium, thus providing distributed functionality and allowing multiple clients to take advantage of the information-gathering capabilities of the server.

Client and server can communicate with one another utilizing the functionality provided by Hyper-Text Transfer Protocol (HTTP). The World Wide Web (WWW) or, simply, the web, includes all the servers adhering to this standard which are accessible to clients via Uniform Resource Locators (URLs). For example, communication can be provided over a communication medium. In particular, the client and server may be coupled to one another via Serial Line Internet Protocol (SLIP) or TCP/IP connections for high-capacity communication. Active within the client is a first process, known as a "browser," which establishes the connection with the server and presents information to the user. The server itself executes corresponding server software which presents information to the client in the form of HTTP responses. The HTTP responses correspond to web "pages" constructed from a Hyper-Text Markup Language (HTML), or other server-generated data.

The client and server typically display browsers and other internet data for a user via a graphical user interface. A graphical user interface is a type of display format that enables a user to choose commands, start programs, and see lists of files and other options by pointing to pictorial representations (icons) and lists of menu items on the screen. Choices can generally be activated either with a keyboard or a mouse.

Sometimes a user desires to print a hardcopy of a document provided in hyper-text format with hyper-link information (i.e., links to other documents and Web sites). Hyper-Text Markup Language (HTML) is typically utilized to create such documents. However, much of the document's usefulness is lost when it is printed as hardcopy. The difference between a screen-rendered hyper-text document and the same document printed as hardcopy is that the hyper-link information in the hardcopy no longer has a graphical user interface visual cue or an application function to "jump" to a linked web page or web site. In fact, a user cannot ascertain, based on the rendered hardcopy document printout, that a hyper-link existed in the screen-displayed document or to which site the document was linked. A need thus exists for allowing users to ascertain, based on any document rendered as hardcopy, such hyper-link information.

SUMMARY OF THE INVENTION

It is therefore an object of the invention to provide for information retrieval methods in data processing systems.

It is another object of the invention to provide methods and systems which can be utilized with data processing systems linked to other data processing systems by associated linking networks.

It is still another object of the invention to provide a method and system which allows hyper-link information utilized in data processing system networks to be retained in a printable medium.

The above and other objects are achieved as is now described. A method and system for rendering in a printable medium hyper-link information contained in a document displayed within a graphical user interface within a data processing system linked to other data processing systems in a data processing network. A document constructed from data generated at a data processing network server is selected and displayed within a graphical user interface. Thereafter, in response to the selection of the document, if the document includes hyper-link information, a reference object is generated. Next, the reference object is associated with the hyper-link information. Thereafter, in response to a user input, the document is automatically printed in a printable medium, in association with the reference object, such that the hyper-link information is automatically presented in association with the printed document.

BRIEF DESCRIPTION OF THE DRAWINGS

The novel features believed characteristic of the invention are set forth in the appended claims. The invention itself, however, as well as a preferred mode of use, further objects and advantages thereof, will best be understood by reference to the following detailed description of an illustrative embodiment when read in conjunction with the accompanying drawings, wherein:

FIG. 7 illustrates a hardcopy printout of a hyper-text document with footnoted hyper-link information.

DETAILED DESCRIPTION OF PREFERRED EMBODIMENT

Figure 1:
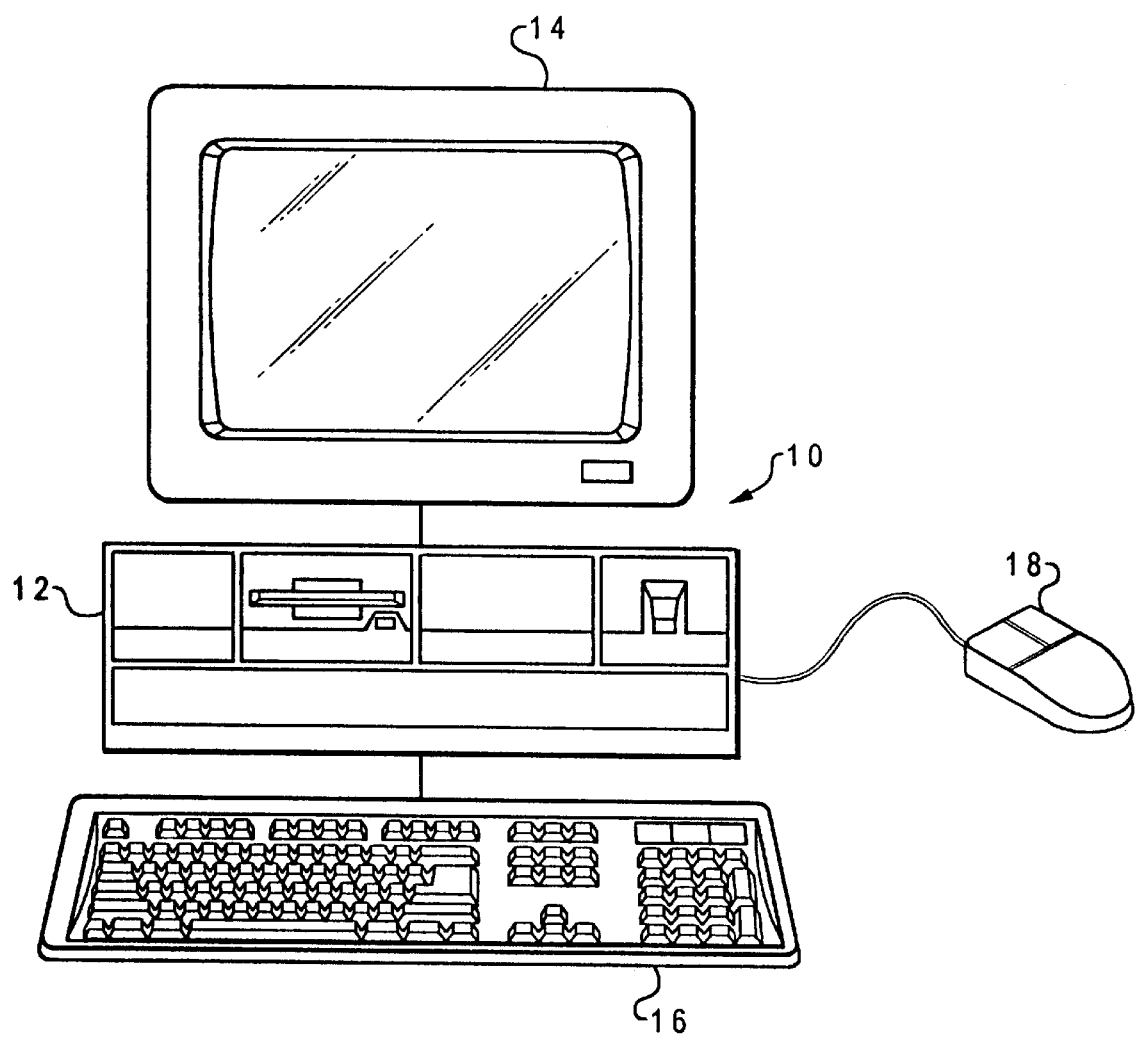
FIG. 1 is a pictorial representation of a data processing system which can be implemented in accordance with the method and system of the present invention.

With reference now to the figures and in particular with reference to FIG. 1, there is depicted a pictorial representation of a data processing system in which the present invention may be implemented in accordance with a preferred embodiment of the present invention. A personal computer 10 is depicted which includes a system unit 12, a video display terminal 14, an alphanumeric input device (i.e., keyboard 16) having alphanumeric and other keys, and a mouse 18. An additional input device (not shown) such as a trackball or stylus can also be included with personal computer 10. Personal computer 10 can be implemented utilizing any suitable computer such as an IBM Aptiva™ computer, a product of International Business Machines Corporation, located in Armonk, N.Y. "Aptiva" is a registered trademark of International Business Machines Corporation. Although the depicted embodiment involves a personal computer, a preferred embodiment of the present invention may be implemented in other types of data processing systems, such as, for example, intelligent workstations or mini-computers. Computer 10 also preferably includes a graphical user interface that resides within a machine-readable media to direct the operation of computer 10.

Figure 2:
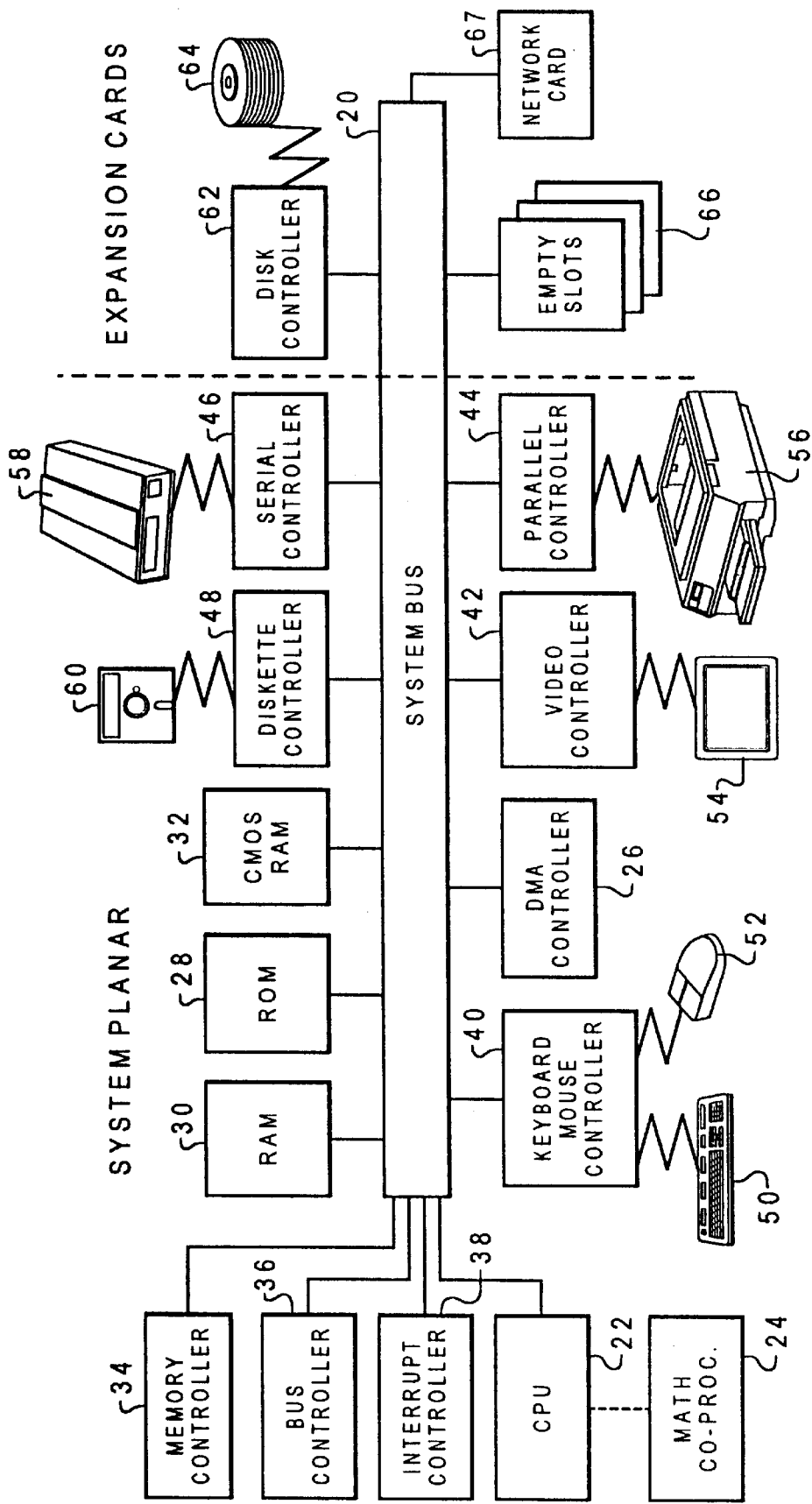
FIG. 2 depicts a block diagram illustrative of selected components in a personal computer system which can be utilized in accordance with the method and system of the present invention.

Referring now to FIG. 2 there is depicted a block diagram of selected components in personal computer 10 of FIG. 1 in which a preferred embodiment of the present invention may be implemented. Personal computer 10 of FIG. 1 preferably includes a system bus 20, as depicted in FIG. 2. System bus 20 is utilized for interconnecting and establishing communication between various components in personal computer 10. Microprocessor 22 is connected to system bus 20 and also may have numeric coprocessor 24 connected to it. Direct memory access ("DMA") controller 26 is also connected to system bus 20 and allows various devices to appropriate cycles from microprocessor 22 during large input/output ("I/O") transfers. Read Only Memory ("ROM") 28 and Random Access Memory ("RAM") 30 are also connected to system bus 20. ROM 28 is mapped into the microprocessor 22 address space in the range from 640K to 1 megabyte. CMOS RAM 32 is attached to system bus 20 and contains system configuration information. Any suitable machine-readable media may retain the graphical user interface of computer 10 of FIG. 1, such as RAM 30, ROM 28, a magnetic diskette, magnetic tape, or optical disk.

Also connected to system bus 20 are memory controller 34, bus controller 36, and interrupt controller 38 which serve to aid in the control of data flow through system bus 20 between various peripherals, adapters, and devices. System unit 12 of FIG. 1 also contains various I/O controllers such as those depicted in FIG. 2: keyboard and mouse controller 40, video controller, 42, parallel controller 44, serial controller 46, and diskette controller 48. Keyboard and mouse controller 40 provide a hardware interface for keyboard 50 and mouse 52. Video controller 42 provides a hardware interface for video display terminal 54. Parallel controller 44 provides a hardware interface for devices such as printer 56. Serial controller 46 provides a hardware interface for devices such as a modem 58. Diskette controller 48 provides a hardware interface for floppy disk unit 60.

Expansion cards also may be added to system bus 20, such as disk controller 62, which provides a hardware interface for hard disk unit 64. Empty slots 66 are provided so that other peripherals, adapters, and devices may be added to system unit 12 of FIG. 1. A network card 67 additionally can be connected to system bus 20 in order to link system unit 12 of FIG. 1 to other data processing system networks in a client/server architecture, or to groups of computers and associated devices which are connected by communications facilities. Those skilled in the art will appreciate that the hardware depicted in FIG.2 may vary for specific applications. For example, other peripheral devices such as: optical disk media, audio adapters, or chip programming devices such as a PAL or EPROM programming devices, and the like also may be utilized in addition to or in place of the hardware already depicted. Note that any or all of the above components and associated hardware may be utilized in various embodiments. However, it can be appreciated that any configuration of aforementioned system may be used for various purposes according to a particular implementation.

Figure 3:
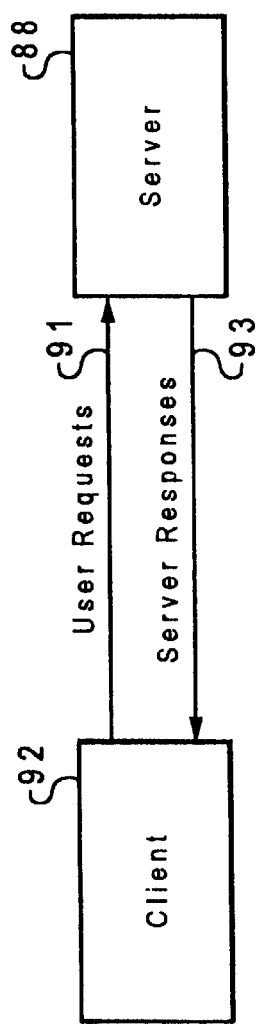
FIG. 3 illustrates a block diagram illustrative of a client/server architecture which can be utilized in accordance with the method and system of the present invention.

FIG. 3 illustrates a block diagram illustrative of a client/server architecture which can be utilized in accordance with the method and system of the present invention. In FIG. 3, user requests 91 for news are sent by a client application program 92 to a server 88. Server 88 can be a remote computer system accessible over the Internet or other communication medium. Server 88 performs scanning and searching of raw (e.g., unprocessed) information sources (e.g., newswire feeds or newsgroups) and, based upon these user requests, presents the filtered electronic information as server responses 93 to the client process. The client process may be active in a first computer system, and the server process may be active in a second computer system, and communicate with one another over a communication medium, thus providing distributed functionality and allowing multiple clients to take advantage of the information-gathering capabilities of the server.

Figure 4:
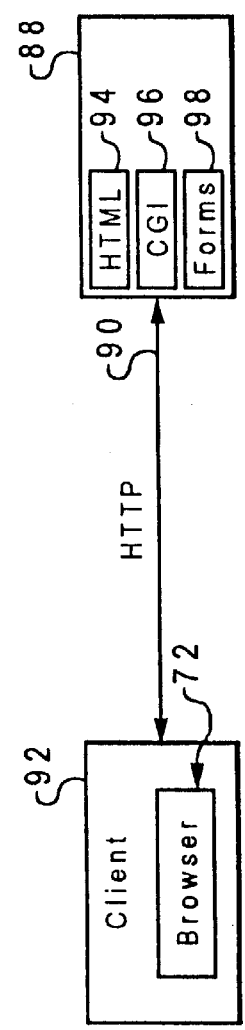
FIG. 4 depicts a detailed block diagram illustrative of a client/server architecture which can be utilized in accordance with the method and system of the present invention.

FIG. 4 illustrates a detailed block diagram of a client/server architecture which can be utilized in accordance with the method and system of the present invention. Although the client and server are processes which are operative within two computer systems, these processes being generated from a high-level programming language (e.g., PERL), which is interpreted and executed in a computer system at runtime (e.g., a workstation), it can be appreciated by one skilled in the art that they may be implemented in a variety of hardware devices, either programmed or dedicated.

Client 92 and server 88 communicate using the functionality provided by Hyper-text Transfer Protocol (HTTP). The WWW or the "web" includes all the servers adhering to this standard which are accessible to clients via Uniform Resource locators (URLs). Active within client 92 is a first process, browser 72, which establishes the connections with server 88, and presents information to the user. Any number of commercially or publicly available browsers may be used, in various implementations, such as the Mosaic-brand browser available from the National Center for Supercomputing Applications (NCSA) in Urbana-Champaign, Ill. Other browsers, such as the Netscape, Netcruiser, or the Lynx-brand browsers, or others which are available and provide the functionality specified under HTTP and the Mosaic browser can be utilized with the present invention.

Server 88 executes the corresponding server software which presents information to the client in the form of HTTP responses 90. The HTTP responses 90 correspond with the Web "pages" represented using Hyper-Text Markup Language (HTML), or other data which is generated by the server. For example, under the Mosaic brand browser, in addition to HTML functionality 94 provided by server 88 (i.e., display and retrieval of certain textual and other data based upon hyper-text views and selection of item(s)), a Common Gateway Interlace (CGI) 96 is provided which allows the client program to direct server 88 to commence execution of a specified program contained within server 88. This may include a search engine which scans received information in the server for presentation to the user controlling the client. Using this interface, and HTTP responses 90, the server may notify the client of the results of that execution upon completion.

Figure 5:
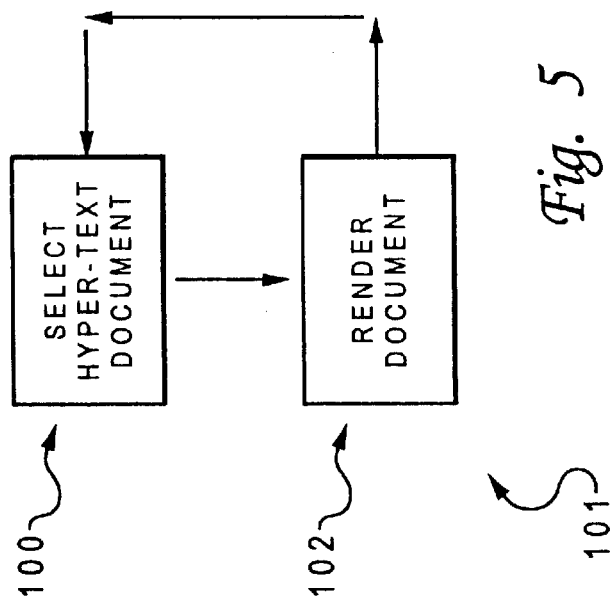
FIG. 5 illustrates a high-level logic diagram illustrative of a method for selecting and rendering hyper-text documents which can be utilized in accordance with the method and system of the present invention.

FIG. 5 depicts a high-level logic diagram 101 illustrative of a method for selecting and rendering hyper-text documents which can be utilized in accordance with the method and system of the present invention. It can be appreciated by one skilled in the art that the following method can be implemented in special-purpose hardware devices, such as discrete logic devices, large scale integrated circuits, application-specific integrated circuits, or other specialized hardware. The description herein has equal application to systems having similar function. As depicted at block 100, a hyper-text document is selected. When a graphical user interface selects its data, it renders such data to the screen for viewing by a user of the graphical user interface. Such data rendered to the screen for viewing can be in the form of hyper-text (i.e., a hyper-text document). When the user selects the next hyper-text document, the hyper-text document is then rendered, as illustrated at block 102. When the user selects the hyper-text document to be printed, the document is rendered for printing instead of viewing on the screen.

For example, from a graphical interface application menu, a user select "open" from a "file" pulldown menu. An example of a raw HTML document is depicted below:

```
<HTML>
Visit
<A HREF = "http://www.austin.ibm.com>IBM</A>
on the world wide web.
</HTML>
```

The document can then be opened by the user and rendered on the screen by the graphical user interface for viewing. Thus, the "raw" HTML document depicted above is rendered on the screen for viewing by the user, as follows:

Visit IBM on the world wide web.

The string text "IBM" is rendered in such a manner as to stand out from the surrounding text. The different font format indicates that the text is hyper-linked to another document, which allows the user to "jump" to the other document by "clicking" with a mouse or other pointing device to the string text "IBM."

From the same pulldown menu, the user can select "print" with a mouse or other pointing device so that the hyper-text document rendered for printing is:

Visit IBM on the world wide web.

The difference between the screen-rendered hyper-text document and the same document printed as hardcopy is that the hyper-text links in the hardcopy no longer have a graphical user interface visual queue or an application function to "jump" to another page. Below is the same hardcopy text, but with a printed reference number or footnote to reference the actual hyper-link information.

Visit IBM [1] on the world wide web.

1. http://www.austin.ibm.com

Thus, the hyper-text document retains its hyper-link information even in hardcopy form. The user can now ascertain the location of the original on-line hyper-links utilizing the hardcopy printout.

Figure 6:
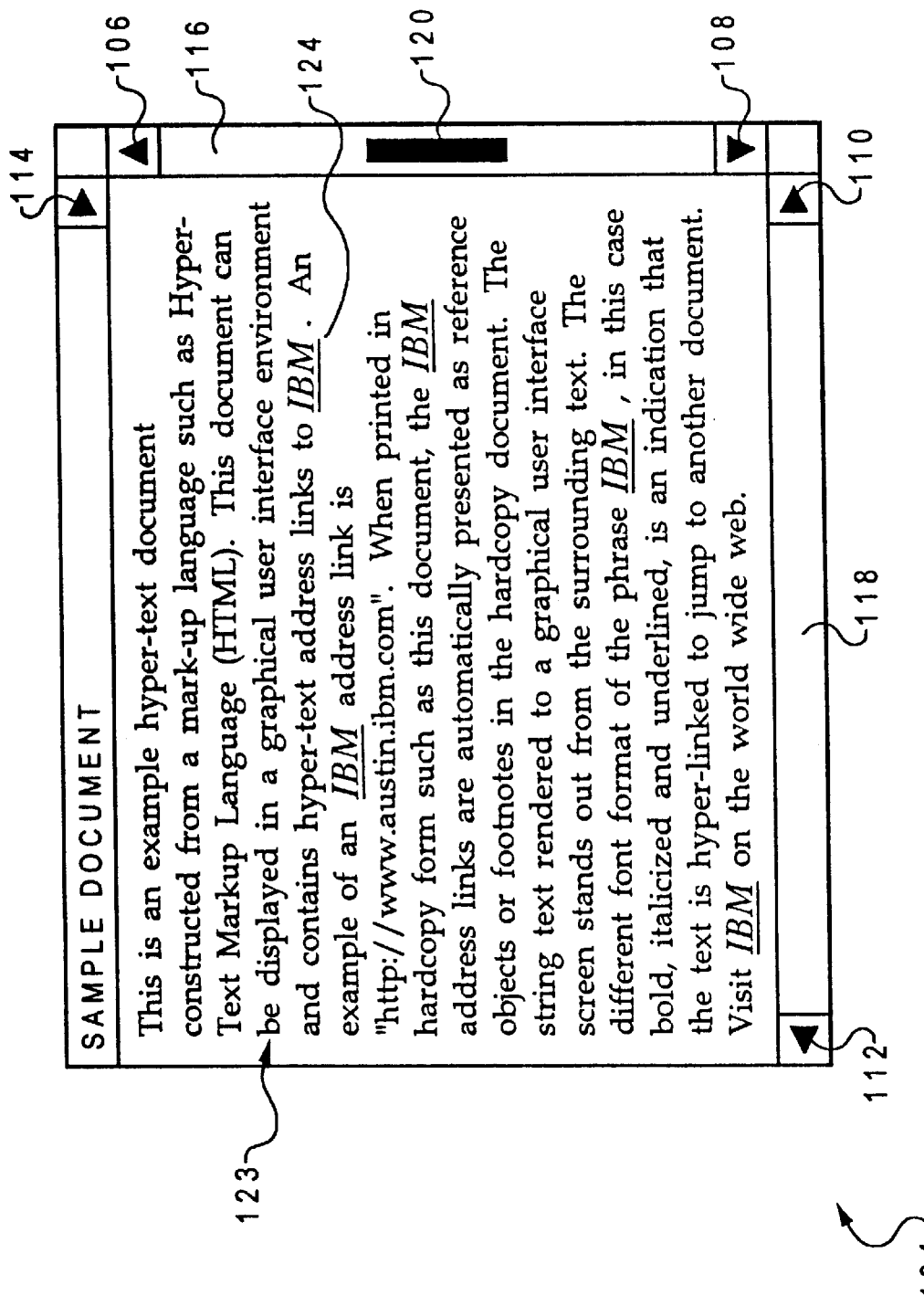
FIG. 6 depicts an example hyper-text document contained within a graphical user interface window which can be utilized in accordance with the method and system of the present invention.

FIG. 6 illustrates an example hyper-text document 123 contained within a graphical user interface window 104 which can be utilized in accordance with the method and system of the present invention. Window 104 displays a portion of a hyper-text document 123 constructed from a mark-up language such as Hyper-Text Mark-up Language (HTML). The size and position of elevator 120 within scroll bar 116 corresponds to the size and position of the current viewable page in relation to hyper-text document 123.

In the example of FIG. 6, because hyper-text document 123 includes too many pages to view simultaneously, the user can position a mouse cursor over up-arrow section 106 or arrow section 108 of scroll bar 116 and click a pointing device (e.g., a mouse) to scroll the hyper-text document 123 upward or downward, as appropriate. A vertical scroll bar 118 includes arrow sections 112 and arrow sections 110 for scrolling hyper-text document 123 respectively left or right. Also, an optional arrow section 114 allows a user to scroll the document right. Thus, the graphical user interface that contains window 104 and hyper-text document 123 is a type of computer display format that enables a user to choose commands, start programs, and see lists of files and other options by pointing to pictorial representations (icons) and lists of menu items on the screen. Choices can generally be activated either with a keyboard or a mouse.

Hyper-text document contains specific string text 124 rendered on the screen by the graphical user interface to stand out from the surrounding text. String text 124 is rendered in a different format. In the example of FIG. 6, string text 124 is rendered as IBM. The different font format of string text 124 is an indication that the text is hyper-linked to "jump" to another document. When a user clicks on string text 124 with a mouse or other pointing device, the graphical user interface will shift the presently viewed hyper-text document 123 to another hyper-linked document.

FIG. 7 depicts a hardcopy printout of a hyper-text document 132 with footnoted hyper-link information. Hyper-text document 132 is analogous to hyper-text document 123 of FIG. 6, only rendered in a hardcopy format instead of on screen via a graphical user interface. Normally, when printing a hyper-text document, hyper-text links in the hardcopy no longer contain visual cues or an application function to "jump" to another page. A user thus is unable to determine from the hardcopy format the hyper-link information or address links. In FIG. 7 hyper-text document 132 is rendered upon a printed hardcopy 128. String text 134 is referenced to a footnote 130 indicating the actual "web" hyper-link address. In the example of FIG. 7, the hyper-link address is: http://www.austin.ibm.com.

Figure 8:
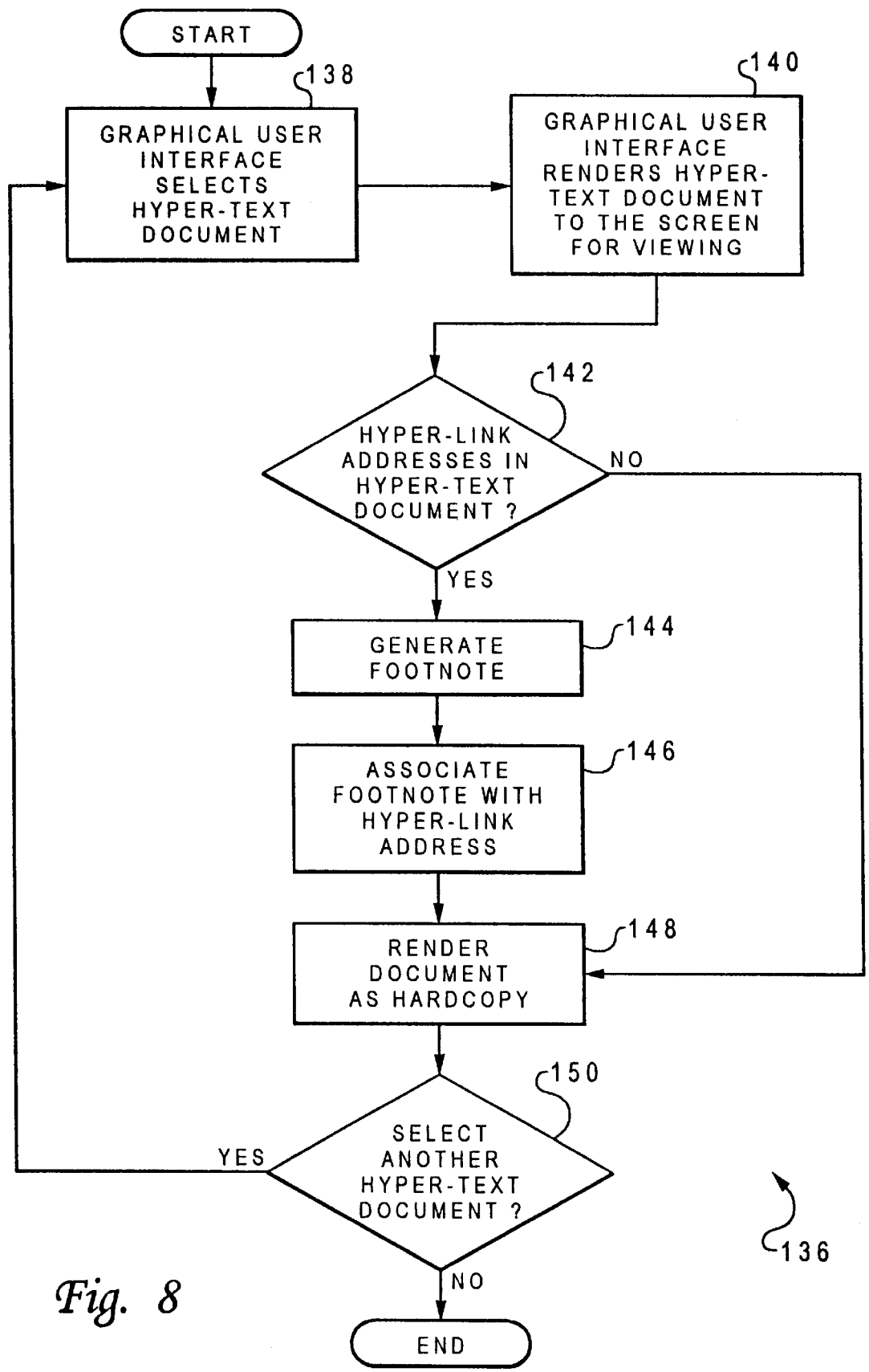
FIG. 8 depicts a logic flowchart illustrative of a method for rendering a printed hyper-text document with footnoted hyper-link information which can be utilized in accordance with the method and system of the present invention.

FIG. 8 illustrates a logic flow chart 136 illustrative of a method for rendering a printed hyper-text document with footnoted hyper-link information which can be utilized in accordance with the method and system of the present invention. As illustrated at block 138, the graphical user interface selects the hyper-text document. As depicted at block 140, the graphical user interface renders the hyper-text document to a screen for viewing by a user. As described at decision block 142, a decision is made determining whether or not hyper-link information such as hyper-text address links (also referred to as hyper-link addresses) are contained within the hyper-text document. If not, then, as depicted at block 148, the hyper-text document is rendered as hardcopy (i.e., printed). If it is determined that such hyper-link information is contained within the document, then appropriate reference objects which can be footnotes, are generated as depicted at block 144.

As illustrated at block 146, the reference object or footnote is associated with the hyper-link information. As described at block 148, the document is rendered as hardcopy, including reference objects or footnotes. As depicted at decision block 150, a decision is made whether or not to select another hyper-text document. Based on the printed hardcopy and the rendered footnotes available on the printed hardcopy document, the reader of the hardcopy printout can ascertain the location and address of the original hyper-links referred to in the hyper-text document by studying the footnotes.

While the invention has been particularly shown as described with reference to a preferred embodiment, it will be understood by those skilled in the art that various changes in form and detail may be made therein without departing from the spirit and scope of the invention.

What is claimed is:

1. A method in a data processing system for rendering in a printable medium, hyper-link information contained in a document displayed within a graphical user interface within said data processing system, wherein said data processing system is linked to at least one other data processing system in a data processing network, comprising the steps of:

selecting a document to be printed from among a plurality of documents, wherein said document is displayed within said graphical user interface and is constructed from data generated at a data processing network server;

generating at least one footnote object in response to a selection of said document, if said document includes hyper-link information, wherein said at least one footnote object references said hyper-link information by including the location of data associated with said hyper-link information;

associating with said at least one footnote objects, said hyper-link information; and automatically presenting, in response to a user input, said document in a printable medium in association with said at least one footnote object, such that said hyper-link information is automatically presented in association with said document, thereby permitting users to ascertain the origin of said hyper-link information via said printable medium.

2. The method of claim 1 wherein the step of generating at least one footnote object in response to a selection of said document, if said document includes hyper-link information, wherein said at least one footnote object references said hyper-link information by including the location of data associated with said hyper-link information, further comprises the step of:

generating at least one footnote object in response to said selection of said document, if said document includes at least one hyper-text address link.

3. The method of claim 2 wherein the step of associating with said at least one footnote object, said hyper-link information, further comprises the step of:

associating with said at least one footnote object, said at least one hyper-text address link.

4. The method of claim 3 wherein the step of automatically presenting, in response to a user input, said document in a printable medium in association with said at least one footnote object, such that said hyper-link information is automatically presented in association with said document, thereby permitting users to ascertain the origin of said hyper-link information via said printable medium, further comprises the step of:

automatically presenting, in response to a user input, said document in a hardcopy form in association with a footnote corresponding to said at least one footnote object, such that said at least one hyper-text address link is automatically presented in association with said document as a footnote, thereby permitting users to ascertain the origin of said hyper-link information via said printable medium.

5. The method of claim 4 further comprising the step of automatically presenting, in response to user input, said footnote in proximity to said at least one hyper-text address link.

6. An apparatus in a data processing system for rendering in a printable medium, hyper-link information contained in a document displayed within a graphical user interface within said data processing system, wherein said data processing system is linked to at least one other data processing system in a data processing network, comprising:

means for selecting a document to be printed from among a plurality of documents, wherein said document is displayed within said graphical user interface and is constructed from data generated at said data processing network server;

means for generating at least one footnote object in response to a selection of said document, if said document includes hyper-link information, wherein said at least one footnote object references said hyper-link information by including the location of data associated with said hyper-link information;

means for associating with said at least one footnote object, said hyper-link information; and means for automatically presenting, in response to a user input, said document in a printable medium in association with said at least one footnote object, such that said hyper-link information is automatically presented in association with said document, thereby permitting users to ascertain the origin of said hyper-link information via said printable medium.

7. The apparatus of claim 6 wherein said means for automatically presenting, in response to a user input, said document in a printable medium in association with said at least one footnote objects such that said hyper-link information is automatically presented in association with said document, thereby permitting users to ascertain the origin of said hyper-link information via said printable medium, further comprises:

means for automatically presenting, in response to a user input, said at least one footnote object in proximity to said hyper-link information.

8. The apparatus of claim 7 wherein said hyper-link information comprises at least one hyper-text address link.

9. The apparatus of claim 8 wherein said printable medium comprises hardcopy.

10. The apparatus of claim 9 wherein said data generated at said data processing network server comprises data written in a mark-up data processing language.

* * * * *